Patented Jan. 9, 1940

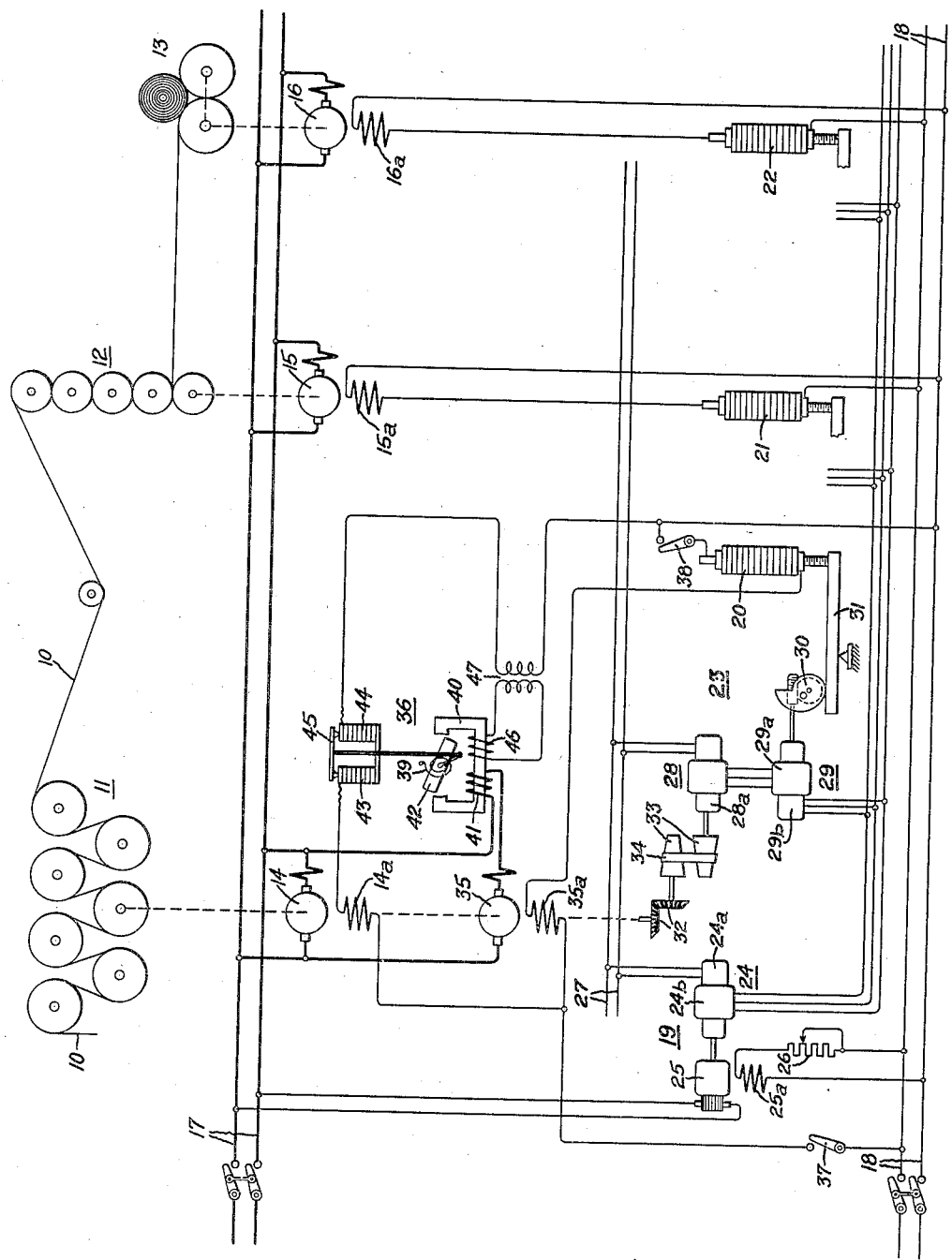

2,186,839

UNITED STATES PATENT OFFICE 2,186,839

CONTROL SYSTEM

Harold W. Rogers, Schenectady, N. Y., assignor to General Electric Company, a corporation of New York Application February 19, 1938, Serial No. 191,508

14 Claims. (Cl. 172—293)

This invention relates to control systems, more particularly to systems for controlling the operation of dynamo-electric machines, and it has for an object the provision of a simple, reliable and improved system of this character.

More specifically, the invention relates to systems for controlling the speed of dynamo-electric machines which operate as motors to drive a load and which at times may be overhauled and driven as generators, and a more specific object of the invention is the provision of means for maintaining the speed of such a machine substantially constant, i. e., for minimizing changes in the speed resulting from changes in load.

An important aspect of the invention is a control system for sectionalized apparatus performing operations on a length of material in which each section of the apparatus is driven by its own individual electric motor. For example, in one type of drive for modern paper making machines, the sizing roll section, drier section, calender section, and winding section, and other sections are driven by individual direct current electric motors. Between the calender section and the drier section a substantial tension exists in the web which relieves the load on the drier motor in proportion to the magnitude of the tension. When the machine is producing a light stock, such as tissue paper or the lighter grades of kraft paper, this tension will be sufficient only partially to unload the drier motor. However, when heavier stocks are being produced such as the heavier grades of kraft paper or any of the board stocks, the tension required by paper making conditions may be sufficient to unload the drier motor entirely and even to require the drier motor to operate as a braking generator up to full load to maintain the speed of the drier section at the required value.

With such heavy tension in the web between the calender and the drier, a sudden "snap-off" or breakage in the web is likely to occur. This breakage may be caused by wet spots in the paper, rough or torn edges, or a number of other causes. Whenever such a snap-off occurs in the web between the calender and drier sections, the load carried by the tension in the web prior to the break is suddenly transferred to the drier motor. As a result of this sudden imposition of load, the speed of the drier motor decreases.

The sectional drive motors of modern papermaking machines are provided with speed regulating equipment for maintaining the required relative speed or "draw" between the sections. This regulating equipment is usually of the integrating type which is very accurate but, if designed for stable operation, does not have a rapid speed of response.

The drier section adjoining the calender section occupies a unique position with respect to rapid load changes. The remaining sections have no sudden load changes and consequently the conventional, highly accurate speed regulating equipment performs satisfactorily on the drive motors for these sections. However, when a heavy load is suddenly thrown on the drier motor, the conventional speed regulating equipment is not fast enough and the speed of the drier motor decreases momentarily. As a result of this, a loop is formed in the web between the drier section and the next preceding section of the machine. A loop at this point causes wrinkles to be formed in the web and when the wrinkled web subsequently passes through the drier and calender sections, the wrinkles are pressed into creases. The resulting sheet is very weak and ragged and subject to further breakage. Such a product is commercially unacceptable and the spoilage costs are therefore correspondingly increased.

Accordingly, a further object of the invention is the provision of means for minimizing changes in the speed of a section of a sectionalized machine in response to sudden changes in the load on that section.

Another more specific but important object of the invention is the provision of means for minimizing the changes in speed of the drier section of a sectionalized paper making machine as a result of changes in load occasioned by strip breakage between the calender and drier sections or other causes, thereby to prevent the formation of loops in the web and the resultant spoilage and loss.

In carrying the invention into effect in one form thereof, a main dynamo-electric machine is mechanically connected to a driven object and a control dynamo-electric machine is mechanically connected to the main machine and thereby to the driven object, and means responsive to variation in an electrical characteristic of the control machine that can be measured at its terminals, such as voltage or current, are provided for controlling the main dynamo-electric machine so as rapidly to decrease this variation in the terminal characteristic. A terminal characteristic of the control machine provides a very sensitive indication of the speed of the control machine and therefore of the speed of the main machine to which it is coupled. Thus, when the speed of the main machine varies from a predetermined value and the resulting variation in a terminal characteristic of the control machine is utilized to control the main machine to decrease the variation in terminal characteristic, the variation in speed of the main machine is consequently rapidly decreased. In addition, a master speed device is provided together with means responsive to a variation in the ratio of the speeds of the control machine and master device for recalibrating the speed regulating means so as to restore this speed ratio to its original value and thereby to restore the speed of the main machine to its predetermined value.

In illustrating the invention in one form thereof, it is shown as embodied in a system for controlling the operation of a sectionalized drive for a paper making machine. It will be understood, however, that the invention has other applications.

For a better and more complete understanding of the invention, reference should now be had to the following specification and to the accompanying drawing, the single figure of which is a simple, diagrammatical illustration of an embodiment of the invention.

Referring now to the drawing, a web of paper 10 is illustrated passing through a nest of drier rolls constituting a drier section 11, then through a stack of calender rolls 12 to a winder 13 which winds the finished paper into a roll. As illustrated, the drier, calender and winding sections of the machine are driven by individual electric motors 14, 15 and 16, respectively. These driving motors are illustrated as direct current type motors and are supplied from a suitable source of D. C. voltage represented by the two supply lines 17. As indicated, motors 14, 15 and 16 are provided with direct current field windings 14a, 15a and 16a which are illustrated as supplied from a suitable source of separate excitation represented by the two excitation buses 18.

On account of the stretch or "draw" in the web between sections, the sectional driving motors 14, 15 and 16 are required to operate at different speeds. In order to maintain the stretch or draw at a constant value it is necessary that the relationship or ratio between the speeds of each motor and the speed of the motor driving each adjoining section be maintained substantially constant. This is accomplished by providing means for maintaining a predetermined ratio between the speed of each sectional driving motor and a master speed, i. e., the speed of a master speed controlling device.

In the drawing, this speed regulating system is illustrated as comprising a master speed controlling device 19 together with a plurality of variable speed regulating resistors 20, 21 and 22, one for controlling the speed of each sectional drive motor, and differential means responsive to the changes in the ratio between the speed of each sectional drive motor and the speed of the master speed controlling device for actuating the variable resistor for that section in such a manner as to restore the speed of the drive motor of that section to the correct value.

The master speed controlling device is illustrated as an electrical motion transmitting device 24 driven at a speed which is preferably substantially constant by a suitable driving means illustrated as a direct current electric motor 25 supplied from a source 17 and having a field winding 25a supplied from the excitation buses 18. A variable speed controlling resistor 26 is included in the field circuit of the motor 25 for the purpose of initially adjusting the speed to any desired value. Adjustment of the speed of the motor 25 to any value adjusts the speed of the machine as a whole because the speed regulating equipment causes each section of the machine to be driven at a speed having a fixed but adjustable ratio with the speed of the master device.

The electrical motion transmitting device 24 has a rotor member 24a and a stator member 24b. The rotor member is provided with a single phase winding (not shown) that is supplied from a suitable source of alternating single phase voltage represented by the two supply lines 27. The stator member 24b is physically similar to the stator member of an alternating current induction motor, i. e., it is provided with a three-element winding that is physically similar to the three-phase winding of an induction motor.

The differential responsive means for actuating the variable speed controlling resistors 20, 21 and 22 associated with the sectional drive motors 14, 15 and 16, respectively are all identical and consequently for the purpose of avoiding repetition and for the purpose of simplifying the drawing only the differential responsive means 23 for actuating the variable resistor 20, is illustrated and described.

This differential responsive means 23 comprises an electrical motion transmitting device 28 that is in all respects identical, with the master motion transmitting device 24 and a differential electrical motion receiving device 29, together with a worm driven cam 30 and a lever 31 actuated by the cam. The rotor member 28a of the transmitting device 28 is connected to the shaft of the drier motor 14 through suitable gearings 32 and a pair of tapered pulleys 33 which are connected by means of a belt 34. The electrical differential receiving device 29 is physically similar to a wound rotor induction motor, that is to say, it has a stator member 29a that is provided with a three-element winding (not shown) that is physically similar to the three-phase stator winding of an induction motor and it has a rotor member 29b that is provided with a three-element winding (not shown) that is physically similar to the three-phase rotor winding of a wound rotor induction motor. The terminals of the stator winding of the differential receiving device 29a are connected to corresponding terminals of the stator winding of transmitting device 28 and the terminals of the rotor winding are connected to corresponding terminals of the stator winding of the master transmitting device 24. As shown, the rotor winding of the transmitting device 28 is connected to the same single phase source of supply 27 as that to which the rotor winding of the master transmitting device is connected.

This part of the equipment operates in the following manner: The belt 34 is shifted by means of a belt shifter (not shown) to a position on the tapered pulleys 33 such that when the speed of the drier motor 14 is the desired value, the rotor member 28a of the transmitter 28 will rotate at the same speed and in step with the rotor member 24a of the master transmitter 24. When this condition obtains the rotor member 29b of the differential electrical receiving device 29 is at standstill. If the speed of the motor 14 increases or decreases with respect to the desired value the speed of the rotor member 28a of the transmitter 28 will correspondingly increase or decrease with respect to the speed of the rotor member 24a of the master transmitter 24. As a result, the rotor member 29b of the differential will rotate at a speed equal to the difference in the speeds of the transmitters 24 and 28, and in a direction dependent upon whether the speed of the rotor of transmitter 28 is greater or less than the speed of the rotor of master transmitter 24. If the speed of the motor 14 increases above the desired value, the rotor of differential receiver 29 will rotate the cam 30 in a counter-clockwise direction to compress the pressure responsive resistor 20, and conversely, if the speed of the motor 14 decreases below the desired value the rotor of receiver 29 will rotate in a clockwise direction to relieve the pressure on the resistor 20.

If the speed regulating resistor 20 were connected in the field circuit of main dynamo electric machine 14, the master speed regulating equipment thus far described would perform very satisfactorily to hold the speed of machine 14 constant if no sudden large changes in the load occurred. Furthermore, it is so accurate that it will hold an exact ratio between the speed of the master transmitter 24 and the speed of the regulated motor. However, if a very heavy stock such as bristol board is being produced the tension in the web 10 between the calender stack 12 and the drier section 11 will be sufficient to unload the drier motor 14 and to drive it as a generator. If under this condition, a snapoff were to occur in the web between the drier 11 and the calender stack 12, several revolutions of the rotor of the differential receiver 29 might be required to weaken the field of the motor 14 sufficiently to change its operation from generating to motoring and during this time a loop would be formed in the web between the drier section and the next preceding section of the machine. The formation of such a loop in the web is very annoying and undesirable for the reasons set forth in the foregoing.

In order to minimize and practically to eliminate the formation of such a loop, additional means are provided. These additional means comprise a control dynamo electric machine 35 mechanically connected to the shaft of a machine 14 and regulating means 36 responsive to a terminal electrical characteristic, such as current or voltage, of the control machine 35 for controlling the main machine 14. Control machine 35 is preferably excited to function as a motor and is preferably supplied from the same source 17 as that from which the main machine 14 is supplied, as indicated. Control motor 35 is provided with a field winding 35a supplied from a suitable source of excitation such as the excitation buses 18 to which it may be connected by means of switching devices 37 and 38.

Load current circulates in the armature circuit of control machine 35 as a result of the difference of counter voltage and applied voltage. This difference produces a current that is limited by the resistance of the armature circuit. Since this difference voltage is the difference between two voltages of considerable magnitude, a small percentage change in counter voltage, resulting from a correspondingly small speed change will produce a large percentage change in difference voltage and consequently a correspondingly large percentage change in armature current. Thus, the value of armature current is a very sensitive indication of relative speed of the control motor.

Regulating means 36 is therefore preferably made responsive to the load current of control machine 35. It comprises a current sensitive element of the torque-motor type which is balanced against a spiral spring 39. The torque motor directly operates a wide range, quick acting rheostat. The stator of the torque motor comprises a U-shaped magnetic core 40 upon which is mounted a D. C. coil 41. The rotor member is a bar type armature 42 of magnetic material mounted on a shaft between the poles of the stator core in such a way that the armature tends to align itself with the stator pole pieces when the coil 41 is energized. The spiral spring 39 mounted on the torque motor shaft tends to rotate the armature in a clockwise direction.

The torque motor armature 42 is connected by a linkage to the equalizing bar 45 which directly operates the rheostatic element as the armature rotates.

The torque motor armature has sufficient torque to counter-balance that exerted by the spiral spring and rheostatic element, and it is designed to hold a current in the coil 41 that varies slightly with the position of the rheostatic element. In other words, regulating device 36 is designed to have a slightly drooping characteristic.

The rheostatic element is composed of a pair of stacks of special non-metallic, resistance material. When the coil 41 is deenergized and the rotor 42 is held in the position illustrated by the spiral spring 39, maximum pressure is applied to the stacks 43 and 44 and the resistance is minimum. When the coil 41 is energized and the rotor member 42 is rotated in a counter clockwise direction against the tension of the spiral spring 39 sufficiently to relieve the pressure on the stack 43, 44 the resistance is maximum.

As illustrated, the core member 40 is provided with a stabilizing winding 46 which is connected through a transformer 47 to the circuit that includes the rheostatic element. This stabilizing winding obviates the need for dashpots or other anti-hunting devices, which easily lose their adjustment and require much maintenance.

The current responsive winding 41 of the regulator is connected in series relationship with the armature of the control motor 35; and the rheostatic element comprising the stacks 43, 44 is connected in series relationship in the field circuit 14a of the drier motor 14. Under normal conditions of current in the armature of the control motor 35 and therefore in the energizing winding 41 of the regulator all the forces of the regulator are balanced and the rotor is stationary.

It will be observed that the pressure responsive speed regulating resistance 20 of the master speed regulating equipment is connected in circuit with the field winding 35a of the control motor 35 and is not connected in circuit with the field winding 14a of the drier motor 14.

In explaining the operation of the control system it will be assumed that a very heavy board stock is being produced by the paper making machine and that the tension in the web between the drier 11 and the calender stack is sufficient to unload the drier motor 14 and to cause it to operate as a braking generator with a substantial load in order to keep the speed of the section at the required value. Initially, the regulator 36 is so adjusted that when the drier section 11 is being operated at the desired speed the difference between the counter voltage of the control motor 35 and the voltage of the supply source 17 will just allow balance current to flow in the current winding 41 of the regulator. By balance current is meant the current at which the force of the spiral spring 39 and the force exerted by the stacks 43 and 44 against the equalizing bar 45 is balanced by the force produced by the current flowing in the winding 41. As long as the drier section continues to operate at this desired speed the rotor element 42 of the regulator 36 and the rotor element 29b of the master speed regulating equipment will be at rest. If a snapoff should occur in the web 10 between the drier 11 and the calender stack 12 the entire friction load of the drier section must then be carried by machine 14 which up until now, it has been assumed, has been acting as a generator. The speeds of the drier motor 14 and the control motor 35 decrease slightly. As the speed of the control motor 35 begins to decrease, its armature current increases and the force produced by the current coil 41 of the regulator correspondingly increases. This force overcomes the tension of the spring 39 which causes the rotor 42 to rotate in a counter-clockwise direction thereby to release the pressure on the stacks 43 and 44. This increases the resistance in the field circuit of the drier motor 14 and decreases its excitation. As a result of the decrease in its excitation the motor 14 draws a heavy current from the line 17 and immediately begins to operate as a motor and assumes the friction load of the dried section 11. The regulator 36 functions so rapidly to change the operation of the machine 14 from generating to motoring and to restore the speed of the section to the desired value that no perceptible loop is formed in the web 10 between the drier section 11 and the next preceding section of the machine. When the speed of the section is restored to nearly the normal value (the regulator is accurate within one-fourth of one per cent) the regulator 36 is restored to a balanced condition.

While the field strength of the motor 14 is decreasing, a voltage appears temporarily across the secondary winding of the transformer 47. This secondary voltage is in such a direction that the magnetomotive force of the stabilizing coil 46 opposes the magnetomotive force of the winding 41. This action tends to halt the original movement of the rheostatic element, and thus prevent overshooting.

During the time the regulator 36 has been functioning to restore the speed of the section, the master speed regulating equipment has also been functioning but its action is so slow in comparison with the action of the regulator 36 that the speed is restored practically to normal before the rotor 29b rotates an appreciable amount.

On account of the drooping characteristic of regulator 36, the speed regulating means comprising control machine 35 and regulator 36 will not completely restore the current in coil 41 and the speed of motor 14 to their original values, and consequently a loop would ultimately be formed in the web unless means were provided for recalibrating this speed regulating means or in some manner compensating the error.

The master speed regulating equipment operates as a followup to effect the necessary recalibration of the speed regulating means to restore the speed accurately to its normal value. As the speed of the machine 14 decreases, the rotor 29b of the differential receiving device rotates the cam 30 in a clockwise direction to release the pressure on the pressure responsive resistance 20. As the pressure is released, the resistance of the resistor 20 is increased and the excitation of the control motor 35 is decreased thereby changing the calibration of the speed regulating means. This causes the current of the control motor 35 to increase and the regulator 36 again functions in the manner described in the foregoing to increase the speed of the drier motor 14 until the rotor of the receiving device 29 becomes stationary at which time the speed of the drier motor 14 will be at the normal correct value.

The action of the regulator 36 in response to changes in the load current of the control motor 35 is so rapid that substantially no loop is formed in the web when a heavy load is suddenly imposed upon the drier motor 14 and the recalibrating action of the master regulating equipment prevents the formation of an appreciable loop as a result of any accumulated inaccuracy of the regulator 36.

The relative capacities of the main dynamo electric machine 14 and the control motor 35 may be any desired ratio. For example, the motor 35 may have the same capacity as the main motor 14 or its capacity may be very small in comparison with that of the main machine 14. The operation is not affected fundamentally by the relative capacities of the machines. In the preferred form, the capacity of the control machine 35 is approximately 1% of the capacity of the main machine 14.

Although in accordance with the provisions of the patent statutes the principle of this invention is described, and the best mode in which it is now contemplated applying that principle, it will be understood that the apparatus and connections shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination a main dynamo-electric machine, a control dynamo-electric machine mechanically coupled to said main machine, means responsive to a deviation of a terminal electrical characteristic of said control machine from a predetermined value for controlling said main machine to decrease said deviation, a master speed device, and means responsive to a variation in the speed ratio of said control machine and master speed device for varying the excitation of said control machine to restore said speed ratio to its original value.

2. A control system comprising in combination, a main dynamo-electric machine, means responsive to a departure in the speed of said machine from a predetermined value for decreasing said departure comprising a control dynamo-electric machine mechanically coupled to said main machine and means responsive to a deviation of a terminal electrical characteristic of said control machine from a predetermined value for controlling said main machine to decrease said deviation, a master speed device, and means responsive to a variation in the ratio of the speeds of said control machine and master speed device for varying the excitation of said control machine to restore said speed ratio to its original value.

3. A control system comprising in combination, a main dynamo-electric machine, speed regulating means for said machine comprising a control dynamo-electric machine mechanically coupled to said main machine and means responsive to a deviation of a terminal electrical characteristic of said control machine from a predetermined value for controlling said main machine to decrease said deviation, a master speed device, and means responsive to a variation in the ratio of the speeds of said control machine and master speed device for recalibrating said speed regulating means to restore said speed ratio to its original value.

4. A control system comprising in combination, a main dynamo-electric machine, speed regulating means for said machine, comprising a control dynamo-electric machine mechanically coupled to said main machine and means responsive to a deviation of a terminal characteristic of said control machine from a predetermined value for controlling the excitation of said main machine to decrease said deviation, a master speed device, and means responsive to a variation in the ratio between the speeds of said control machine and said master speed device for recalibrating said speed regulating means at a rate dependent upon the amount of said variation thereby to restore said ratio to its original value.

5. A control system for a main dynamo-electric machine comprising speed regulating means responsive to a departure of the speed of said machine from a predetermined value, said means comprising a control dynamo-electric machine mechanically coupled to said main machine and means responsive to a deviation of a terminal characteristic of said control machine from a fixed value for controlling said main machine to decrease said deviation thereby to restore the speed of said main machine approximately to said predetermined value, a master speed device, and means responsive to a variation in the ratio of the speeds of said control machine and master speed device for recalibrating said speed regulating means thereby to restore said ratio to its original value and to complete the restoration of the speed of said main machine to said predetermined value.

6. A control system for a main dynamo-electric machine comprising in combination, speed regulating means for said machine responsive to a departure of the speed of said machine from a predetermined value, said means comprising a control dynamo-electric machine mechanically coupled to said main machine and means responsive to deviation of a terminal electrical characteristic of said control machine from a fixed value for controlling the excitation of said main machine to restore said characteristic approximately to said fixed value, thereby to restore the speed of said main machine approximately to said predetermined value, and means for recalibrating said speed regulating means to complete the restoration of the speed of said main machine to said predetermined value comprising a master speed device and means responsive to a variation in the ratio between the speed of said control machine and master speed device for varying the excitation of said control machine.

7. A control system comprising in combination, a main dynamo-electric machine, speed regulating means for said machine responsive to a departure of the speed of said machine from a predetermined value for restoring the speed of said machine approximately to said value comprising a control dynamo-electric machine mechanically coupled to said main machine and means responsive to deviation of a terminal electrical characteristic of said control machine from a fixed value for controlling said main machine to restore said characteristic approximately to said fixed value, and means for recalibrating said speed regulating means to complete the restoration of the speed of said main machine to said predetermined value comprising a variable resistor for controlling said control machine, a master speed device, and means responsive to a variation in the ratio between the speeds of said control machine and master speed device for actuating said resistor.

8. A control system for a main dynamo-electric machine comprising in combination, speed regulating means for said machine responsive to a departure of the speed of said machine from a predetermined constant value for restoring the speed of said machine approximately to said predetermined value, said means comprising a control dynamo-electric machine mechanically coupled to said main machine and means responsive to deviation of a terminal electrical characteristic of said control machine from a fixed value for controlling the excitation of said main machine to restore said characteristic approximately to said fixed value, and means for recalibrating said speed regulating means to complete the restoration of the speed of said main machine to said predetermined value comprising a variable resistor in the field circuit of said control machine, a master speed device and means responsive to a variation in the ratio of the speed of said control machine and master speed device for varying said resistor to vary the excitation of said control machine.

9. A control system for a main dynamo-electric machine comprising in combination, speed regulating means for said machine responsive to a departure of the speed of said machine from a predetermined constant value for restoring the speed of said main machine approximately said predetermined value, said means comprising a control dynamo-electric machine mechanically coupled to said main machine and means responsive to deviation of a terminal electrical characteristic of said control machine from a fixed value for controlling the excitation of said main machine to restore said characteristic approximately to said fixed value, a master speed device comprising an electric motor and an electrical motion transmitting device driven thereby, an electrical motion transmitting device mechanically coupled to said control machine, a differential electrical receiving device electrically connected to said transmitting devices to be responsive to variations in the ratio of the speeds of said master device and control machine for recalibrating said speed regulating means thereby to restore said ratio to its original value and to complete the restoration of the speed of said main machine to said predetermined value.

10. A control system for a main dynamo-electric machine comprising in combination, speed regulating means for said machine responsive to a departure of the speed of said machine from a predetermined value for restoring the speed of said main machine, approximately to said predetermined value, said means comprising a control dynamo-electric machine mechanically coupled to said main machine and means responsive to deviation of a terminal electrical characteristic of said control machine from a fixed value for controlling the excitation of said main machine to restore said characteristic approximately to said fixed value, and means for recalibrating said speed regulating means to complete the restoration of the speed of said main machine to said predetermined value comprising a master speed device having an electrical motion transmitting device and driving means therefor, a second electrical motion transmitting device mechanically coupled to said control machine, a differential electrical motion receiving device electrically connected to said transmitting devices and means controlled by said receiving device for varying the excitation of said control machine.

11. A control system comprising in combination, a main dynamo-electric machine, speed regulating means for said machine comprising a control dynamo-electric machine mechanically coupled to said main machine, and means responsive to a deviation of the load current of said control machine from a predetermined value for controlling said main machine to decrease said deviation, a master speed device, and means responsive to a variation in the ratio of the speeds of said control machine and master speed device for recalibrating said speed regulating means thereby to effect restoration of said speed ratio to its original value.

12. A control system comprising in combination, a main dynamo-electric machine, speed regulating means for said machine comprising a control dynamo-electric machine mechanically connected to said main machine, a torque motor responsive to a deviation in the load current of said control machine from a predetermined value and a resistor controlled thereby for controlling said main machine to decrease said deviation, a master speed device and means responsive to a variation in the ratio of the speeds of said master speed device and said control machine for recalibrating said speed regulating means to restore said speed ratio to its original value.

13. A control system comprising in combination, a main dynamo-electric machine, speed regulating means for said machine responsive to a departure of the speed of said machine from a predetermined value for decreasing said departure, comprising a control dynamo-electric machine mechanically coupled to said main machine and a regulating device responsive to a deviation of a terminal electrical characteristic of said control machine from a fixed value for controlling said main machine to decrease said deviation, said device having a coil responsive to said characteristic and a stabilizing winding, a master speed device, and means responsive to a variation in the ratio of the speeds of said control machine and master device for recalibrating said speed regulating means to effect the restoration of said speed ratio to its original value thereby to complete the restoration of said speed to said predetermined value.

14. A control system for apparatus having a plurality of sections operating on a length of material comprising in combination, an electric motor for driving one of said sections, a main dynamo-electric machine mechanically connected to a preceding section of said apparatus, speed regulating means for said machine comprising a control dynamo-electric machine mechanically coupled to said main machine and means responsive to variation of a terminal electrical characteristic of said control machine from a predetermined value for controlling said main machine to decrease said deviation, a master speed device, and means responsive to a variation in the ratio of the speeds of said control machine and master device for recalibrating said speed regulating means to restore said ratio to its original value thereby to maintain the speed of said main dynamo-electric machine substantially constant irrespective of changes in the tension in said material between said sections.

HAROLD W. ROGERS.